Figure 1:
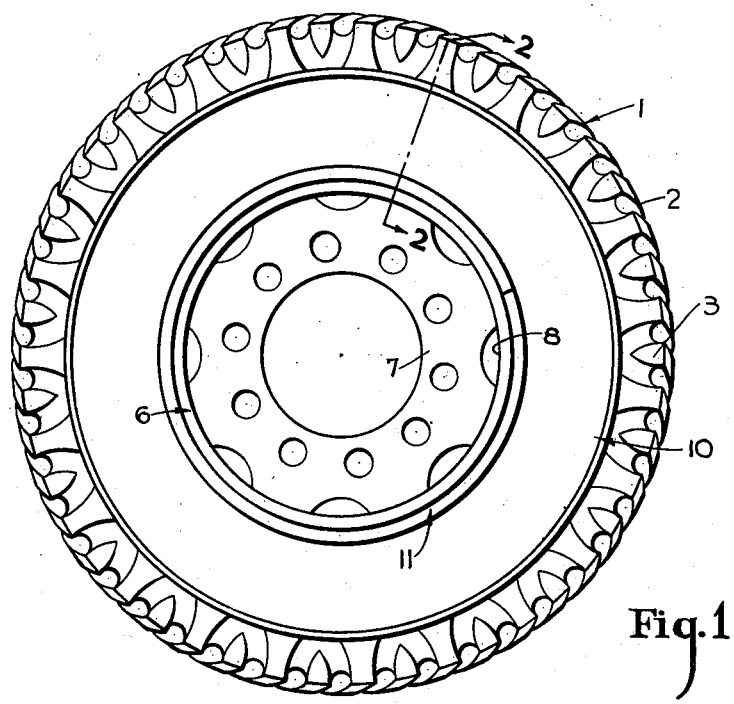

Nov. 22, 1949  G. A. HANDY  2,488,864
WHEEL AND TIRE ASSEMBLY
Filed Aug. 31, 1945  2 Sheets-Sheet 1

Inventor
George A. Handy
By
Attorney

Inventor
George A. Handy

Patented Nov. 22, 1949

2,488,864

UNITED STATES PATENT OFFICE 2,488,864

WHEEL AND TIRE ASSEMBLY

George A. Handy, Akron, Ohio, assignor to Wingfoot Corporation, Akron, Ohio, a corporation of Delaware Application August 31, 1945, Serial No. 613,861

2 Claims. (Cl. 152—410)

The present invention relates to an improvement in a vehicle wheel and tire assembly. More particularly, the invention relates to a form of shield which will afford protection for the sidewalls of a pneumatic tire in such an assembly against abrasion, cuts and other similar damage encountered in the normal operation of the assembly.

It is an object of the present invention to provide an improved form of vehicle wheel and tire assembly which will insure adequate protection for the tire to enable it to render maximum service from a mileage and performance standpoint.

It is another object of the present invention to provide a means for preventing the occurrence of abrasion, sidewall bruises, cuts and the like in pneumatic tires which frequently greatly reduces the effective life of the tire.

A further object of the invention is to provide a form of device which advantageously serves the dual purpose of protecting the tire sidewall and coacting with the rim flange to maintain the beads of the tire in substantially perfect balance with respect to the tread portion thereof to enable the tire to produce the utmost service and to insure longer mileage and trouble-free operation.

It is a still further object of the present invention to provide effective sidewall protection for the pneumatic tire in a vehicle wheel and tire assembly and at the same time to enable the use of cooperating parts such, for example, as the rim, locking ring, etc. of stock sizes and standard design.

Another and still further object of the invention is to provide a unit having all of the above attributes in addition to being easy to assemble as well as simple and economical to manufacture in large quantities.

In modern underground mining operations, for example, coal mining and the like, the material mined is removed in a number of shuttle cars one or more of which is provided with motive power. These cars, employed either singly or in pairs, are driven through the corridors of the mine to haul the coal or ore from the working face where they are loaded to some central point within the mine proper where the material is transferred to suitable units which transport it to the surface. In maneuvering the shuttle cars about in the corridors of the mine, the tire equipment employed thereon frequently experiences severe damage which materially shortens tire life.

The corridors of such mines are usually narrow and are formed in or adjacent to the ore seams. The floors and walls of the corridors may be compacted shale, ore or rock and may, in addition, be shored with timbers and the like, all of which present sharp edges, fissures or projecting portions with which the tires of the vehicles frequently come into contact. Such repeated contacts often cause serious damage to the sidewalls of the tires particularly when the cars are heavily loaded and, thus, reduce the life of the tires with consequent loss of efficiency and an increase in operating costs.

The tire assembly contemplated by the present invention is particularly advantageously adapted to use in such instances. The shield embodied in the wheel and tire assembly insures maximum protection for the tire sidewalls and serves to prevent damage thereto. Moreover, these assemblies are readily interchangeable since they embody stock or standard parts and are, therefore, easily assembled and disassembled. The assembly, thus, affords maximum operating efficiency for the unit.

Various forms of auxiliary disks have been employed in wheel and tire assemblies chiefly as a trim or as a safety measure for the purpose of supporting the wheel in the event that the tire becomes deflated in the course of operation of the vehicle. Most of these conventional forms of disks are either secured directly to the wheel or mounted in pairs on opposite sides of the tire. It will be obvious that neither of those conventional structures mentioned would be satisfactory for the purposes for which the apparatus of the instant application is intended.

Certain distinct problems arise out of the mounting of any such means directly on the rim adjacent the tire one of which is the tendency of this mounting to unbalance the tire beads with respect to the tread of the tire. Such installations frequently operate to alter the height of one flange with respect to the other causing a deflection of the tire carcass and shifting most of the load to the lowest flange. Moreover, such installations rob the space normally required for reception of the tire beads on the base of the rim to produce paramount stability of the tire.

All such factors as those enumerated tend to reduce the operating efficiency of the tire. This unbalancing of the beads is particularly prevalent where only a single disk is used as a tire shield. The assembly of the present invention obviates this difficulty in that it is designed to maintain the tire beads in perfectly balanced relationship with respect to the tread portion of the tire and, thereby, to insure its stability. Actually, the employment of the structure contemplated by the present invention does not in the least reduce the rim base dimension.

There are other types of auxiliary disks employed on wheel and tire assemblies which are intended primarily as means of protection, or shields, for the tire sidewalls. In general, those in use are secured to the wheel and extend outwardly therefrom, in such fashion as to furnish a measure of protection for the tire. Most of these are, however, disadvantageous for the reason that, being larger, they are necessarily heavier and extend outwardly some distance from the tire sidewall widening the overall tread dimension of the car and presenting unsafe working conditions adjacent thereto. Moreover, those structures depending upon the bolts by which the wheel is secured to the hub for support tend to exert shear and undue strain upon the bolts.

The structure of the present invention is adapted to cooperate with the locking ring in the rim assembly and is so mounted that it may be of much smaller size without reducing its operating effectiveness. Being smaller, the shield of the invention is lighter in weight. By reason of its mounting on the rim, there is no danger with respect to the shield contemplated by the present invention creating a shear on the wheel mounting bolts. In addition, the shield design enables it to closely hug the sidewall of the tire.

Other objects, features and advantages of the present invention will be apparent to those skilled in the art as the detailed description of the accompanying drawing proceeds.

Figure 2:
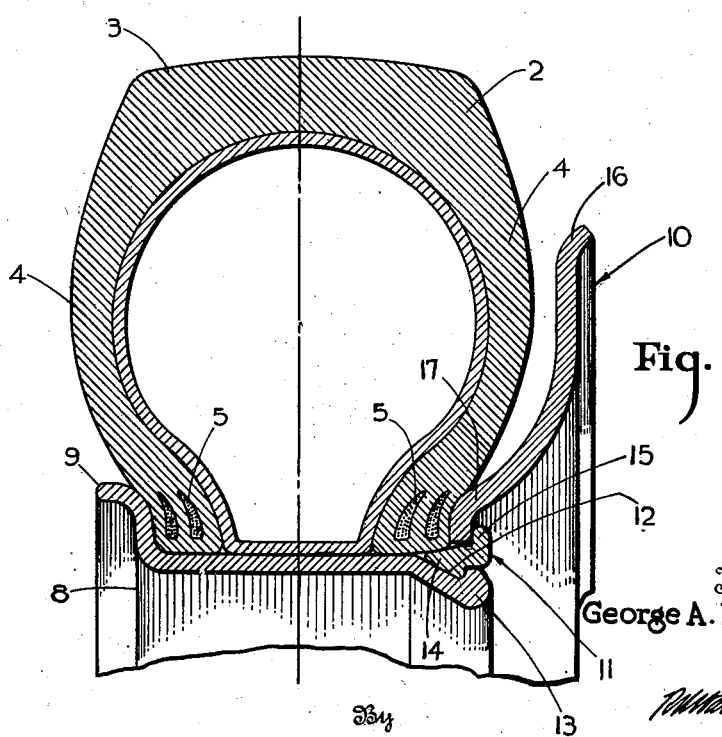
Figure 3:
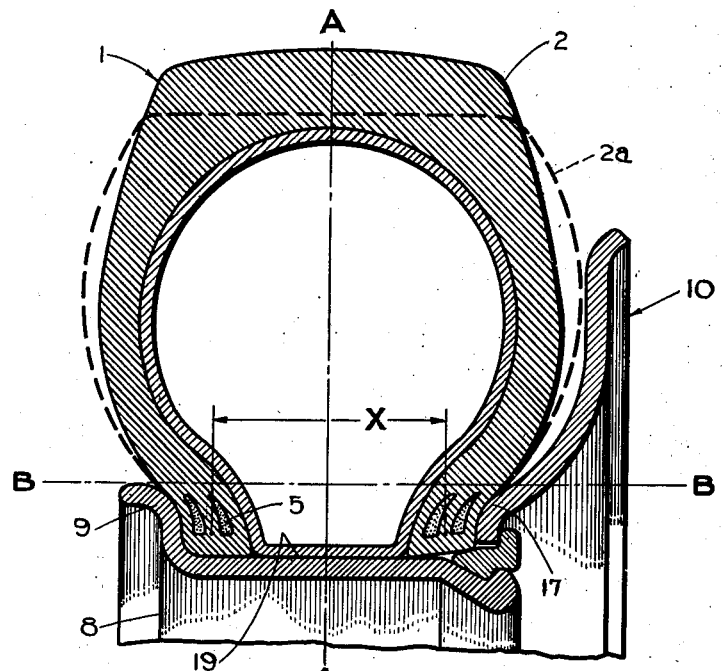
Figure 4:
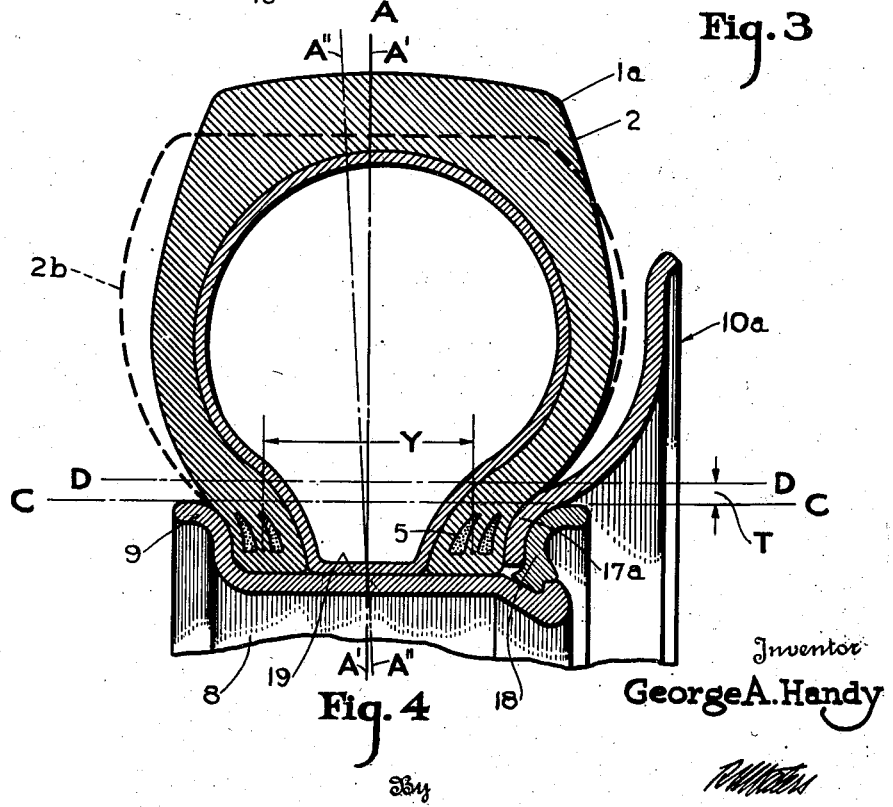

In the drawing, Figure 1 represents a side elevation of a vehicle wheel and tire assembly of the type embodying the teachings of the present invention. Figure 2 is a cross-section on an enlarged scale through the assembly of Figure 1 as seen from the line 2—2 therein. Figure 3 corresponds to Figure 2 but illustrates certain operating principles of the invention. Figure 4 corresponds generally to Figures 2 and 3 but illustrates, by way of contrast, a conventional form of shield.

In Figure 1 of the drawings, the reference numeral 1 identifies a typical vehicle wheel and tire assembly with which the teachings of the present invention are advantageously adapted to be employed. The assembly 1 includes a tire 2 having a tread portion 3, sidewalls 4 and beads 5 in combination with a wheel 6. The wheel 6 embodies a web portion 7 which is adapted to be mounted upon the hub of a vehicle and which may be welded or otherwise suitably secured to a rim 8. It will be understood that, in the case of a demountable rim, said rim may be disengagably secured to the wheel as by means of a plurality of equally spaced lugs mounted on the wheel for engaging the rim.

The open-beaded tire 2 is mounted upon the rim 8 with one of its beads 5 urged against an upstanding flange portion 9 formed integrally with the rim. The other bead 5 is secured in place upon the rim 8 as by means of a dished annular member or shield 10 which is, in turn, held in place by a suitable locking means which takes the form of a split locking ring 11. The rim assembly may advantageously be generally of the type shown and described in Riggs application Serial Number 504,021, filed September 27, 1943. The shield 10 is advantageously formed by a stamping operation from a comparatively heavy gauge metal plate of a suitable thickness depending upon the service to which it is to be put.

The rim 8 is provided, at the edge thereof opposite the flange portion 9, with a gutter 12 which is advantageously of inwardly tapering configuration as shown in Figure 2 and terminates in a peripheral abutment portion 13. The abutment portion 13 provides a means against which the wedge-shaped portion 14 of the locking ring 11 seats thereby insuring a positive interlocking engagement between the ring and the rim 8. An outwardly projecting annular rib portion 15 is provided on the locking ring 11 and formed integrally therewith to engage the lowermost portion of the shield 10 for urging the same against the bead 5 of the tire 2.

The shield 10 is provided at its outermost periphery with a flared portion 16 as indicated in Figure 2. This flared portion 16 insures against cutting of the tire sidewall portion 4 in the event that the tire 2 should be permitted to become under-inflated in operation. Such under-inflation will permit the tire sidewalls 4 to bow outwardly bringing the one adjacent the shield 10 into contact therewith, a factor which should be avoided in the interest of preventing damage to the tire from the shield itself. An ample factor of safety is provided by the shield structure of the invention in that its peripheral diameter is sufficiently smaller than the corresponding tire dimension, even when the tire is run with any reasonable degree of under inflation, that it can still achieve a maximum of sidewall protection and yet remain out of contact with the surface over which the tire is operated.

As illustrated in Figure 3 of the drawings, the line A—A represents the cross-sectional axis of the tire 2 about which the cross-section of the tire should be symmetrical both when the vehicle on which the tires are mounted is loaded and unloaded to insure maximum stability and peak performance of the tire. With the shield structure and mounting contemplated by the present invention, a perfect balance of the tire 2 is achieved. When the tire is under load, the cross-section thereof approaches the pattern illustrated by the dotted outline 2a in Figure 3.

It will be apparent that under all conditions, the vehicle wheel and tire assembly embodying the teachings of the present invention will uniformly transmit the load to the flange 9 of the rim 8 and the flange portion 17 of the shield 10. Thus, the tire will not be subject to excessive wear in any portion thereof. This factor is directly traceable to the fact that the flange 9 and the flange portion 17 are of the same height as will be observed by the fact that both conform substantially to the line B—B. The tire assembly is in perfect balance when the above conditions exist.

By way of contrast to the foregoing, attention is directed to Figure 4 in which a different form of shield 10a is employed in a wheel and tire assembly indicated generally as 1a embodying a tire 2, rim 8, and a flanged locking rim 18. It will be noted that the flange portion 17a of the shield 10a is, of necessity, higher to the extent of the thickness of the stock from which the shield is fabricated than is the flange 9 of rim 8. Thus, the flange heights confining the tire 2 on the rim 8 vary by the distance T (equivalent to the plate stock thickness) by which the line C—C, representing the height of rim flange 9, is disposed below the line D—D, representing the height of flange portion 17a of the shield 10a.

When the wheel and tire assembly 1a is free from load, the effect of the shield 10a on the tire 2 mounted on the rim 8 is the tendency to cause the cross-sectional mass of the tire to shift bodily to the left as seen in Figure 4 along the rim base. Thus, the original cross-sectional center line A—A thereafter assumes the position A'—A' in Figure 4. Under load, however, there is a distinct tendency of the tire 2 to roll against or in the direction of the flange 9 of the rim 8. This tendency accentuated by the height differential T between flange 9 and the flange portion 17a of shield 10a results in the application of an undue proportion of the force created in the tire by the load being exerted upon the flange 9 thereby destroying structural balance.

The tendency of the tire 2 to roll under load, referred to above, also results in a deflection of the cross-section of the tire to an extent approaching the dotted outline 2b. This deflection is further reflected in the tilting of the cross-sectional axis A'—A' in the fashion indicated by the new position identified as A"—A" shown in Figure 4 of the drawings.

An additional feature of importance in enabling a tire to provide maximum performance is attributable in part at least to the fact that the flange portion 17 of the shield 10 embodying the principles of the present invention, when secured in place against the tire bead 5, does not displace the tire bead as will be apparent from Figure 3. This is not true of the assembly illustrated in Figure 4 since the space at the rim base 19 is reduced to the extent of the thickness of the plate stock employed in forming the shield 10a. Thus, it will be noted that the spacing indicated as X between beads 5 of the tire 2 in the assembly of Figure 3 is greater than the corresponding bead spacing Y of the assembly of Figure 4.

Present day design of rim assemblies particularly those embodying locking rings and flanges seeks to provide a wider base for the tire beads on the rim to insure peak tire performance. Thus, the apparatus of the present invention is in keeping with latest designs and is highly advantageous in that it makes possible a stable tire mounting with each half of the tire cross-section being symmetrical with respect to the cross-sectional axis of the tire under all conditions of load. This is accomplished by reason of the fact that the shield 10 does not rob space from the rim base against which the tire beads seat.

Moreover, the shield 10 cooperates with the locking ring 11 to provide flange portions of substantially equal heights, a feature which additionally insures stability of the tire mounting upon the rim. Thus, as we have seen the flange portion 9 of the rim 8 is advantageously of substantially the same height as the flange portion 17 of the shield 10 formed by the reverse bend in the face of said shield. It will be understood that these flange heights may, of necessity, vary slightly with certain tire sizes; any such variation is, however, insufficient to render the tire mounting unstable.

It will be obvious that certain modifications may be embodied in the wheel and tire assembly 1 without in any way departing from the spirit or scope of the invention.

While in accordance with the patent statutes one best known embodiment of the invention has been illustrated and described in detail, it is to be particularly understood that the invention is not limited thereto or thereby, but that the inventive scope is defined in the appended claims.

What I claim is:

1. A tire and rim mounting for use on mine shuttle cars and the like, said mounting embodying an open-beaded, straight sidewall pneumatic tire and a rim assembly comprising a generally cylindrical base portion with an integrally formed flange portion at one edge thereof for engaging one of the tire beads and a generally V-shaped gutter at the other edge thereof; a split locking ring having a generally wedge-shaped toe portion for locking engagement with the rim gutter and a seating portion adjacent the toe portion providing at least partial support for the other tire bead, said seating portion terminating in an abutment; and a dished plate supported exclusively on the seating portion of the locking ring adjacent the abutment thereon and extending radially outward from its support in spaced, generally parallel relation to the sidewall of the tire.

2. A tire and rim mounting for use on mine shuttle cars and the like, said mounting embodying an open-beaded, straight sidewall pneumatic tire and a rim assembly comprising a generally cylindrical base portion with an integrally formed flange portion at one edge thereof for engaging one of the tire beads and a generally V-shaped gutter at the other edge thereof; a split locking ring having a toe portion thereon of a shape generally complementary to the V-shaped gutter for locking engagement therewith and a seating portion adjacent the toe portion terminating in an annular upstanding rib, said seating portion cooperating with the cylindrical base portion to support the other bead of the tire; and a dished plate supported exclusively on the seating portion between the tire bead thereon and the rib, said plate extending radially outward from the seating portion in spaced generally parallel relation to and substantially coextensive with the sidewall of the tire.

GEORGE A. HANDY.

REFERENCES CITED

The following references are of record in the file of this patent:

UNITED STATES PATENTS

| Number | Name | Date |
|---|---|---|
| 1,375,051 | Lackner | Apr. 19, 1921 |
| 1,493,040 | Klaus | May 6, 1924 |

FOREIGN PATENTS

| Number | Country | Date |
|---|---|---|
| 605,436 | France | 1926 |